United States Patent Office.

EARDLEY LOUIS CHARLES D'IVERNOIS, OF PARIS, FRANCE.

Letters Patent No. 114,652, dated May 9, 1871

IMPROVEMENT IN PRODUCING THE ELECTRIC LIGHT.

The Schedule referred to in these Letters Patent and making part of the same.

*To all whom it may concern:*

Be it known that I, EARDLEY LOUIS CHARLES D'IVERNOIS, of Paris, in the Empire of France, have invented an "Improvement in the Means for Producing Electric Light;" and I do hereby declare that the following is a full and exact description thereof.

The object of my improvement in the means for producing electric light is to incresse the intensity of such light without being obliged to increase that of the galvanic battery, magneto-electric machine, or other suitable source of electricity from which the current or currents are obtained by means of which the light is developed, the invention being applicable to electric light obtained either from continuous or from discontinuous currents, and whether these latter are developed by means of galvanic batteries, magneto-electric machines, or other sources of electricity capable of producing electric light.

The method commonly in use for producing electric light consists in causing an electric current to pass through two carbon-electrodes or carbon-points situated with their pointed ends in opposition to each other, and at the required distance apart for developing between them what is called the voltaic arc.

I have found that by dividing the electric current into two, three, or more smaller or partial currents, the total amount of which corresponds with that of the original current, viz., so as not to require any increase of the source from which this latter is obtained, a very considerable increase of light is obtained.

This dividing of the current into a suitable number of smaller currents may be obtained by causing the current to pass, instead of through only two carbon-electrodes or carbon-points, through any suitable larger number of them, provided they being situated in such manner in respect to each other as to cause the voltaic arcs developed by them, or suitably crossing or intersecting each other, by which means, without increasing the importance of the galvanic battery, or other suitable source of electricity from which the electric current made use of is derived, a considerable increase of the electric light will be obtained.

Instead of dividing the current into two or more partial or smaller currents, the electric source itself might be divided into several distinct parts, so as to give rise to several partial and distinct smaller currents; thus, for instance, if I have a current obtained from a galvanic battery composed of any suitable number of galvanic elements, I may either divide the current into two, three, or more partial or smaller currents by conveying the current through several pairs of electrodes, arranged in such manner in respect to each other as to cause the voltaic arcs developed by them to cross or intersect each other; or I may divide the battery into several smaller batteries, so as to give rise to a suitable number of smaller currents, each of which latter acting on its own pair of electrodes, these pairs being situated in such manner in respect to each other as to cause the mutual intersecting or crossing of the voltaic arcs developed by them.

My method is applicable, whatever may be the nature of the electric current or currents to be made use of, or that of the source from which the said current or currents are derived, viz., either galvanic batteries, magneto-electric machines, or other suitable sources of electricity.

As for the carbon or other electrodes to be made use of, they must be situated in such manner in respect to each other as to cause the voltaic arcs developed by them suitably to intersect or cross each other, by which means not only a considerable increase in the intensity of the electric light, but also a much greater steadiness or fixity of this latter, will be obtained.

What I claim as my invention, in the means for producing electric light, is—

1. The division of the electric current or currents to be made use of for this purpose into two or more partial or smaller currents.

2. Causing the current or currents to pass through any suitable number of electrodes in such manner as to give rise to two or more voltaic arcs duly crossing or intersecting each other, substantially as described and for the purposes set down.

EARDLEY LOUIS CHARLES D'IVERNOIS.

Witnesses:
A. G. WADE,
I. SOUTH.